United States Patent [19]

Cottrill et al.

[11] 4,295,775
[45] Oct. 20, 1981

[54] UNLOADER FOR HOPPER CARS AND METHOD

[75] Inventors: William P. Cottrill, Tampa, Fla.; Andrew J. Cisternino, Atlanta, Ga.

[73] Assignee: Evacuators, Inc., Tampa, Fla.

[21] Appl. No.: 82,963

[22] Filed: Oct. 9, 1979

[51] Int. Cl.³ ............................................. B65G 67/24
[52] U.S. Cl. .................................. 414/375; 222/195; 414/786
[58] Field of Search ...................... 414/373, 375, 786; 406/61, 134; 222/195, 413

[56] References Cited

U.S. PATENT DOCUMENTS 2,406,546  8/1946  Kinney et al. ...................... 414/375
3,942,689  3/1976  Dakin et al. ........................ 222/195
3,958,722  5/1976  Dugge et al. ....................... 222/195

FOREIGN PATENT DOCUMENTS 140881  9/1930  Switzerland .......................... 406/61

*Primary Examiner*—Robert G. Sheridan
*Attorney, Agent, or Firm*—James B. Middleton

[57] ABSTRACT

A method and an apparatus for unloading hopper cars. The method includes the steps of placing a tube in the vicinity of an open hopper of the hopper car, and discharging a blast aerator through the tube. The apparatus includes a housing rotatably mounting the tube. The tube includes a tip to assist in entering the material to be unloaded. A motor to rotate the tube is mounted in the housing; and, a blast aerator is receivable on the housing. A fitting seals between the stationary blast aerator and the rotatable tube, and the fitting can receive an adapter to vary the size of the blast aerator.

7 Claims, 6 Drawing Figures

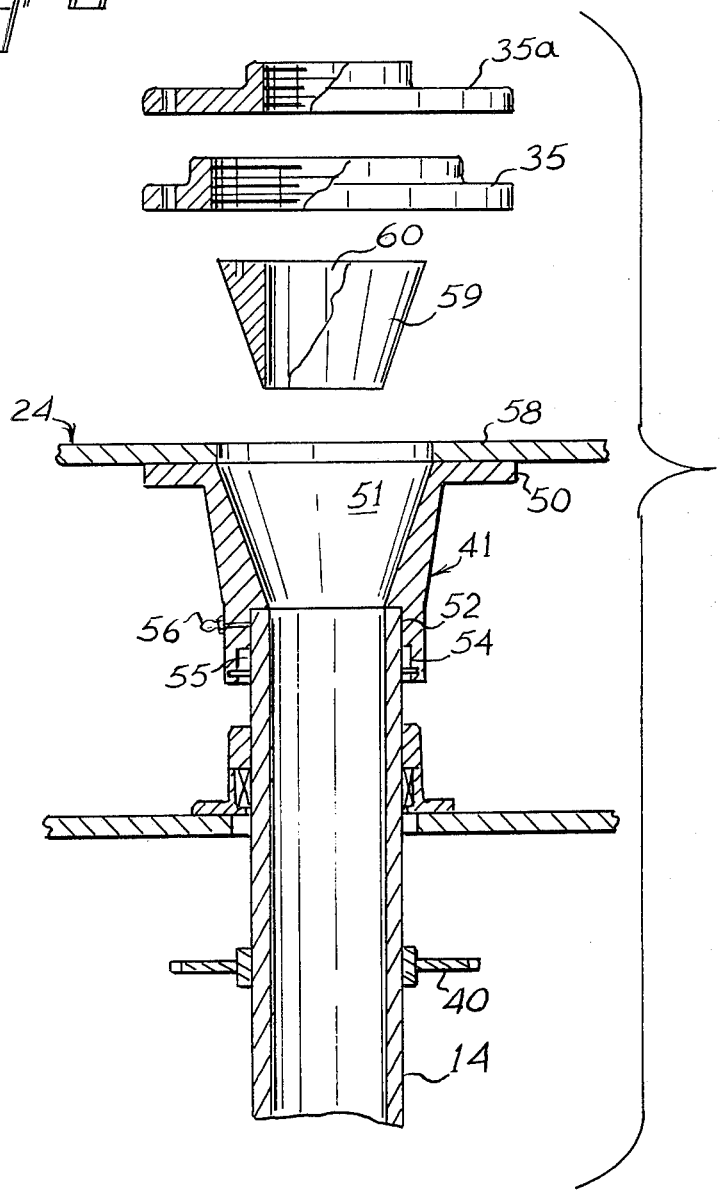

4,295,775

UNLOADER FOR HOPPER CARS AND METHOD

FIELD OF THE INVENTION

This invention relates generally to unloading means, and is more particularly concerned with a method and apparatus for facilitating flow of material through an open hopper door in railroad cars and the like.

BACKGROUND OF THE INVENTION

A great variety of material is shipped in railroad cars having doors, or gates, at the bottom thereof for unloading material. Virtually any material that is capable of "flowing" can be shipped in such cars, and unloaded through the hopper doors. These materials include such diverse things as woodchips, gravel, sand, chemicals in powder form, and numerous other materials. The shipping in a hopper car is very convenient because the material can be easily loaded through the large open top of the car; then, when the car is to be unloaded, the car can be conveyed to tracks having open spaces therebetween, the hopper doors can be opened, and the material will flow from the car into any receptacle placed below.

The problem with the use of hopper cars is that, while the material may be flowable at the time the car is loaded, the contents are caused to settle by the bouncing and rocking during transportation so that the material is more densely packed on arrival. Also, the material may be rained on in transit and the additional moisture will cause some materials to stick with even greater tenacity.

Prior art means for unloading hopper cars where the material is compacted and stuck together so that the material will no longer flow through the hopper doors has included such means as augers to bore down and loosen the material, and vibrators placed against the side walls of the hopper car. With the vibrators, the hopper doors are opened, and the vibrators are energized causing the car to shake in order to loosen the material inside and urge it to flow through the open hopper doors. These vibrators are only somewhat successful because the material is frequently so firmly packed and cohesive that vibration of the car will not cause the material to flow. Augers have met with little commercial success, and are difficult and time-consuming to use. There are also devices to shake the entire car, and these devices are rather successful; however, shaking the entire car both requires an extremely large amount of energy and is highly detrimental to the car. Car shakers frequently exert such forces on the hopper car that rivets are loosened and seams break loose so that a railroad car will have to be repaired much more frequently. One of the more successful means for unloading hopper cars is the car inverter, whereby the entire car is turned upside down so that the contents are emptied through the large opening in the top thereof. While these devices are rather successful, the equipment required to invert the entire railroad car is extremely large, requiring a very large capital investment in addition to a very large operating cost because of the energy required to invert every railroad car.

It is known in the art to utilize a device known as a blast aerator to assist in material flow in bins; however, these blast aerators have been used only through the side walls of bins and a railroad car has never been provided with the necessary openings or brackets for mounting blast aerators. Thus, there has never been previously devised any means for utilizing a blast aerator in the unloading of a railroad car.

SUMMARY OF THE INVENTION

The present invention overcomes the above-mentioned and other difficulties with prior art unloading devices and methods by providing a blast aerator having an extension tube leading therefrom, and means for supporting the blast aerator above a hopper car while the extension tube is placed adjacent to an open hopper. With the extension tube so placed, the blast aerator is triggered to dispense the air under pressure to facilitate material flow. Thus, the present invention provides a large amount of air under pressure within a short period of time to fluidize the material in the immediate vicinity of the open hopper and simultaneously to provide a force directed towards the open hopper to cause motion of the material through the hopper door.

BRIEF DESCRIPTION OF THE DRAWINGS

These and other features and advantages of the present invention will become apparent from consideration of the following specification when taken in conjunction with the accompanying drawings in which: the accompanying drawings in which.

DESCRIPTION OF A PREFERRED EMBODIMENT

Figure 1:
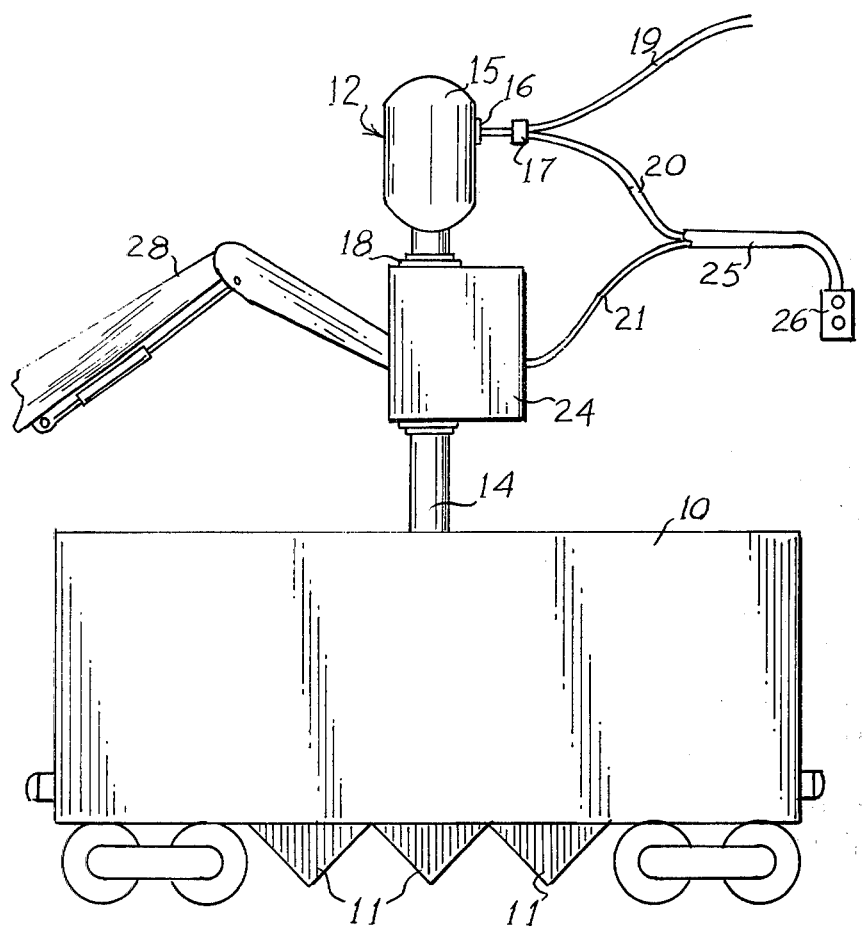
FIG. 1 is a side elevational view showing an unloading device made in accordance with the present invention supported in relationship to a hopper car for unloading the hopper car.

Referring now more particularly to the drawings, and to that embodiment of the invenion here chosen by way of illustration, FIG. 1 shows a substantially conventional railroad hopper car 10 having hoppers 11 at the bottom thereof for unloading material. The unloading device of the present invention is generally designated at 12 and is shown with the extension tube 14 extending into the hopper car 10 with the extension tube 14 aligned with one of the hoppers 11.

The device 12 includes a conventional blast aerator 15 at the upper end thereof. Those skilled in the art will realize that the conventional blast aerator includes an inlet 16 for compressed air, and includes a solenoid operated valve 17 which is a three way valve operable either to direct air under pressure to fill the tank with air, or to open the control piston to the atmosphere and allow the tank to discharge the entire load of air through the discharge port 18. The compressed air line 19 and the electrical control lines 20 are shown somewhat schematically. It will be seen that there is also an electrical control line 21 extending from the unloader housing 24, the lines 20 and 21 being joined in a cable 25 and extending to a control box 26.

The unloader housing 24 can be supported in any fashion desired, and it is contemplated that a piece of generally conventional equipment such as a crane, loader or the like will be used to support the housing 24. There is illustrated in FIG. 1 an arm 28 as a means for supporting the housing 24 above the hopper car 10, and it will be understood that this arm 28 can place the housing 24 above any one of the hoppers 11, and can raise and lower the entire device as required.

Figure 2:
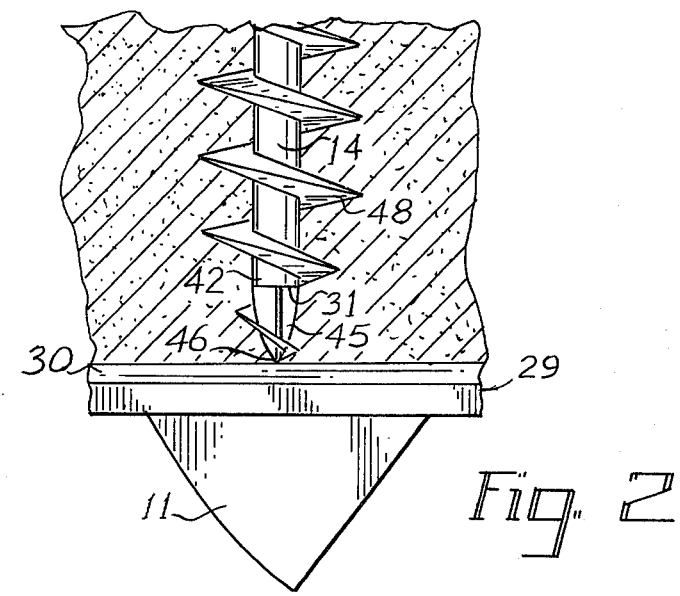
FIG. 2 is a partial longitudinal cross-sectional view through the hopper car, as shown in FIG. 1 of the drawing, showing placement of the extension tube with respect to the hopper car.
Figure 3:
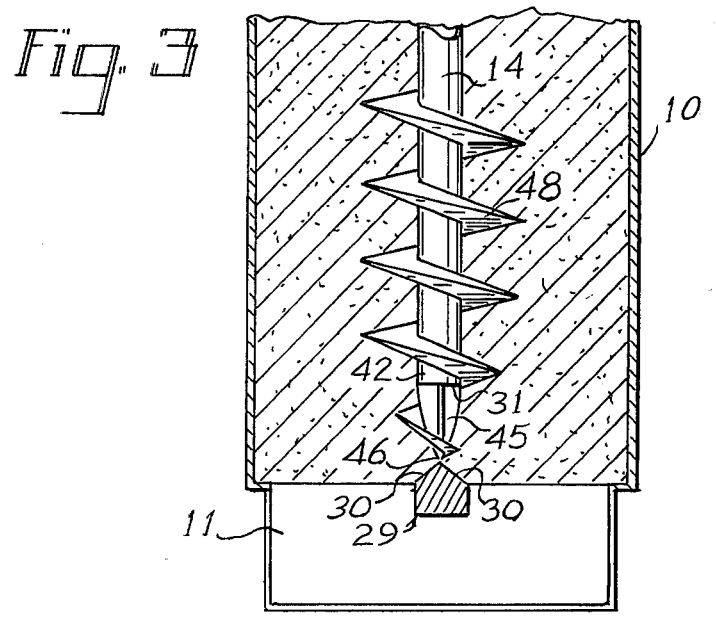
FIG. 3 is a view similar to FIG. 2, but shownin transverse cross-section.

Looking now at FIGS. 2 and 3 of the drawings, it will be understood that the conventional railroad hopper car includes a central sill 29 extending the full length thereof and acting as the principal support for the car. As a result, the sill 29 divides the hopper 11 approximately in half laterally and extends the full length of the hopper longitudinally. As is best shown in FIG. 3 of the drawings, the sill 29 conventionally has sloped upper surfaces 30 to assist in providing for material flow when the hopper door is opened.

It will now be understood that the extension tube 14 is placed into the material within the hopper car so that the discharge end 31 of the extension tube 14 is approximately at the center portion of a hopper 11. With the discharge end 31 in position, the solenoid on the blast aerator would be energized to shift the valve 17 and cause the entire quantity of air within the tank to be discharged. The force of this air under pressure is directed, for the most part, through the open hopper door to facilitate the flow of material therethrough. Also, because of the sloped surfaces 30, the air from the extension tube 14 will be directed to the sides to assist in loosening and fluidizing material at each side of the hopper.

Those skilled in the art will realize that a conventional blast aerator provides such a quantity of air under such pressure in such a short time that the air tends to move outwardly and affect a large area around the actual point of discharge. Thus, when the blast aerator is caused to discharge the air therefrom through the discharge end 31 of the extension tube 14, the material in a relatively large area, including the hopper 11, will be loosened, and somewhat fluidized, to assist in the flow of material through the hopper 11.

It will of course be realized that one blast of the blast aerator may not be sufficient to dislodge all of the material, and a repeat of the blast may be necessary. For most materials, it is contemplated that a single blast will unload most of the material adjacent to each hopper, so that one blast would be provided at each of the plurality of hoppers on a hopper car 10. Also, of course, the air supply pressure may be increased for use of the present device, it being understood that an increase in the pressure of the supply will increase both the volume of air in the blast aerator and the pressure, of force, of the blast.

Figure 4:
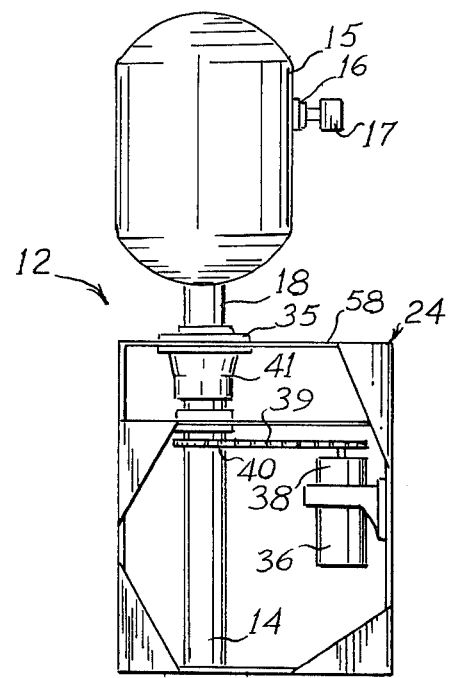
FIG. 4 is a side elevational view of an unloading device made in accordance with the present invention and showing the complte extension tube.

From an understanding of the construction of the unloader 12, attention is directed to FIG. 4 of the drawings. In FIG. 4 it will be seen that the unloader 12 includes the housing 24 which comprises a generally rectangular box having an internally threaded collar 35 for receiving the conventional blast aerator 15. The housing 24 includes a drive motor 36 coupled to a gear reducer 38 for driving, through a chain 39, a sprocket 40 fixed to the extension tube 14. The upper portion of the housing 24 includes a fitting 41 which is fixed to the housing 24 and contains appropriate seals for allowing the extension tube 14 to rotate therein while the fitting 41, and the housing 24, remain stationary. This will be discussed in more detail hereinafter.

The lower portion of the unloader 12 includes a flanged tip generally designated at 42 for assisting the extension tube 14 in entering material to be unloaded without unduly clogging the extension tube 14. This tip 42 is shown in more detail in FIG. 5 of the drawing where it will be seen that the tip 42 of the extension tube 14 is attached to the balance of the tube by threads 44 so that the tip 42 can be removed and replaced as desired. As it is here disclosed, the tip 42 includes radial flanges 45 which extend from the discharge end 31 of the tube 14. The flanges 45 are pointed at their lowermost ends 46 to assist the tube in entering material.

It will therefore be seen that, as the extension tube 14 is rotated, the point 46 will enter the material to be unloaded, and the flanges 45 will continuously sweep away material to allow entrance of the extension tube 14. This sweeping away of material as the extension tube 14 enters the material prevents the clogging of the discharge end 31 of the tube 14.

Figure 5:
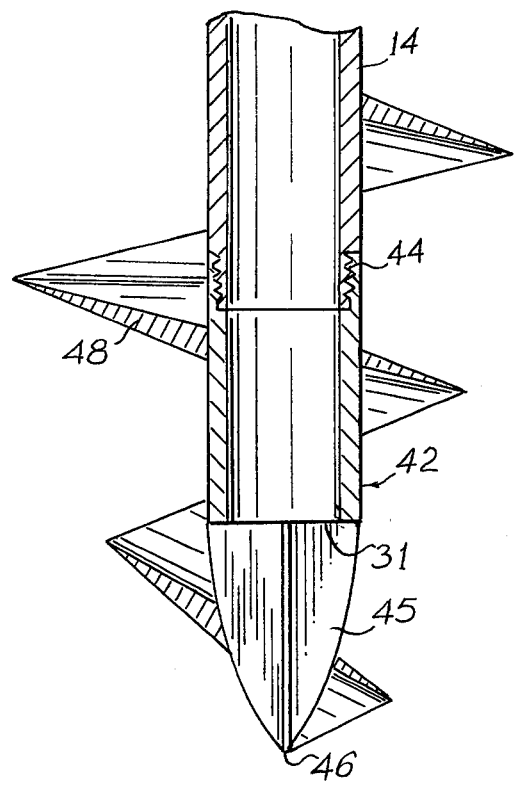
FIG. 5 is an enlarged detail longitudinal cross-sectional view showing the tip of the extension tube as shown in FIG. 4; and, FIG. 6 is an enlarged longitudinal cross-sectional view showing the means for connecting a conventional blast aerator to the device of the present invention, parts thereof being shown exploded.

Looking primarily at FIGS. 4 and 5 of the drawings, it will be seen that there is a helical flange 48 surrounding the lower section of the extension tube 14 and the tip 42. This flange 48 provides an auger-like arrangement which will both assist the extension tube 14 in penetrating material to be unloaded, and will provie for some agitation of the material to aid in the unloading as is well known to those skilled in the art.

Attention is next directed to FIG. 6 of the drawings. Here it will be seen that the fitting 41 is bolted or otherwise fixed to the housing 24 at its flange 50. The fitting 41 has an internal opening 51 that is frusto-conically shaped, and the opposite end of the fitting 41 includes a first bore 52 to receive the extension tube 14 and a second, larger diameter, bore 54 to receive a seal 55.

It will be remembered that the extension tube 14 is rotated by means of the sprocket 40, which is rotated by the chain 39, while the fitting 41 remains stationary. Thus, the bore 52 is sufficiently large that the extension tube 14 does not touch the fitting 41, but there are several thousandths of an inch of clearance between the extension tube 14 and the bore 52. To prevent the escape of air through this open space, the seal 55 is provided. While those skilled in the art may be aware of any number of materials for use as the seal 55, one highly desirable substance is a seal made of "Viton". This is a plastic material which is a copolymer of vinylidene fluoride and hexaflouropropylene. The "Viton" seals are very rubber-like in their consistency, but can withstand temperatures in the vicinity of 200° C. even when in contact with most oils, solvents and the like. Additionally, these materials have good resistance to oxygen, ozone and the normal weather conditions.

To maintain the junction between the extension tube 14 and the bore 52 completely free of grit or other foreign matter that may damage the surfaces, a grease fitting 56 is provided to inject grease into the area and exclude dust and the like.

Those skilled in the art will be aware that blast aerators conventionally are manufactured in two sizes. The smaller size of blast aerator has a discharge port with a four inch diameter threaded nipple, and the larger blast aerator has a discharge port with a six inch diameter threaded nipple. The unloader of the present invention can be used with either size of blast aerator depending on the material to be unloaded, the size of the cars and the like. In order ot adapt the single unloading device to the two different sizes of blast aerators, the fitting 41 is provided with the frusto-conical opening 51, the smaller end of the opening 51 having a diameter substantially equal to the inside diameter of the 4 inch xtension tube 14, and the larger end of the opening 51 having a diameter approximately equal to the insie diameter of the 6 inch discharge nipple of the blast aerator. Due to this arrangement, it will be seen that a collar 35 can be bolted directly to the end plate 58 of the housing 24, and a 6 inch nipple of a blast aerator can be threaded directly into the collar 35. This will provide for the large size of blast aerator to be used in conjunction with the unloader. If a 4 inch blast aerator is preferred, the opening 51 receives an adaptor 59 having outside dimensions generally equal to the inside dimensions of the opening 51 so that the adaptor 59 can be received within the opening 51. The adaptor 59 then has an axial bore 60 having a diameter substantially equal to the inside diameter of a 4 inch extension tube 14. With the adaptor 59 in place within the opening 51, the collar 35 is omitted and a collar 35a is installed in lieu of the collar 35. The collar 35a has holes arranged to correspond to the fastening holes of the collar 35, but the center threaded portion is of such size to receive the 4 inch nipple on a blast aerator.

From the foregoing discussion, it should now be understood that, when a railroad hopper car is to be unloaded, a supporting means such as the arm 28 will lift the unloading device 12 to a position above one of the hoppers 11 of the car 10 and place the tip 42 against the material in the car 10. The buttons on the control box 26 will be manipulated to cause the motor 36 to be energized and, through the gear reducer 38, the chain 39 and the sprocket 40, the extension tube 14 will be rotated causing the flanges 45 to rotate and clear a path for the discharge end 31 of the extension tube 14. As the helical flange 48 enters the material, the flange 48 may assist in urging the extension tube 14 through the material, and may somewhat assist in loosening the material for easier unloading. This process will continue, and the arm 28 will gradually allow the unloading device 12 to be lowered until the lowermost end of the device is adjacent to the center sill in the hopper car as shown in FIGS. 2 and 3 of the drawings. At this point, the buttons on the control box 26 will be appropriately manipulated to open the valves in the blast aerator 15 so that the air therein is discharged through the discharge end 31 of the extension tube 14. This large quantity of air under high pressure will literally blast some of the material through the open hopper 11, and will tend to fluidize the surrounding material so that it is flowable and will tend to pass through the open hopper 11 without further assistance. After the material in the vicinity of the first hopper 11 is discharged, the arm 28 will move the unloader 12 to a similar position over the next hopper 11, and the enire process will be repeated.

With an increased input pressure on the blast aerator, it will also be seen that the tip 31 need not be placed precisely at the open hopper 11. The exact placement required will be determined by the material being unloaded, the pressure used, and the degree of packing.

It will of course be understood that the unloader of the present invention will be equally usable with any hopper, including a stationary hopper; however, the stationary hoppers do not generally lend themselves to the use of mobile equipment. In addition, a stationary hopper can generally be outfitted with numerous devices to cause a breakup of compacted material which resists flow.

It will of course be understood by those skilled in the art that the particular embodiment of the invention here presented is by way of illustration only, and is meant to be in no way restrictive; therefore, numerous changes and modifications may be made, and the full use of equivalents resorted to, without departing from the spirit or scope of the invention as defined in the appended claims.

We claim:

1. A method for unloading material from a hopper car or the like wherein said material is normally flowable and is packed, which retards such flowing, said method including the steps of opening the gate to one hopper of said hopper car, placing a tube through the top of said hopper car into said hopper car and in said material with the end of said tube generally at said one hopper, and discharging a blast aerator through said tube for discharging some of said material through said one hopper and fluidizing material within said car to render such material flowable, said hopper car having a longitudinal sill extending across the hoppers, said method including the step of placing said end of said tube immediately above said sill prior to the step of discharging a blast aerator through said tube so that said sill disperses the air from said blast aerator, and including the steps of rotating said tube about its axis while urging said material away from said end of said tube to prevent entry of material into said tube, and inserting said tube into said material in order to perform the step of placing a tube in said material.

2. A method for unloading material from a hopper car or the like wherein said material is normally flowable and is packed, which retards such flowing, said method including the steps of opening the gate to one hopper of said hopper car, placing a tube through the top of said hopper car into said hopper car and in said material with the end of said tube generally at said one hopper, and discharging a blast aerator through said tube for discharging some of said material through said one hopper and fluidizing material within said car to render such material flowable, and including the steps of rotating said tube about its axis while urging said material away from said end of said tube to prevent entry of material into said tube, and inserting said tube into said material in order to perform the step of placing a tube in said material.

3. Unloading apparatus for facilitating material flow from a hopper car or the like, said hopper car having an open top, at least one hopper on the bottom thereof through which material is to flow for unloading said material, said apparatus comprising a housing disposable over said open top of said hopper car, a tube rotatably carried by said housing and depending therefrom, said tube being of sufficient length to extend from said housing through said material generally to said hopper of said hopper car, a blast aerator receivable on said housing in communication with said tube, and means for discharging said blast aerator through said tube, and including seal means fixed to said housing, said seal means rotatably receiving said tube in one thereof, said seal means communicating with said blast aerator at the other end thereof, said seal means defining an opening therethrough, said opening having a first diameter for receiving said tube, said opening having a second diameter for communicating with said blast aerator, said second diameter being larger than said first diameter, and including an adapter receivable within said opening, said adapter having outside dimensions generally equal to the dimensions of said opening for being received within said opening, said adapter defining a second opening therethrough, said second opening having said first diameter at one end thereof, and a third dimeter at the opposite end thereof, said third diameter being less than said second diameter.

4. Unloading apparatus for facilitating material flow from a hopper car or the like, said hopper car having an open top, at least one hopper on the bottom thereof through which material is to flow for unloading said material, said apparatus comprising a housing disposable over said open top of said hopper car, a tube rotatably carried by said housing and depending therefrom, said tube being of sufficient length to extend from said housing through said material generally to said hopper of said hopper car, a blast aerator receivable on said housing in communication with said tube, and means for discharging said blast aerator through said tube, and including seal means fixed to said housing, said seal means rotatably receiving said tube in one end thereof, said seal means communicating with said blast aerator at the other end thereof, and further including a tip carried by said tube, said tip including a plurality of flanges disposed across the lower end of said tube generally radially of said tube and pointed at their lowermost ends, said flanges converging to a common point.

5. Apparatus as claimed in claim 4, and including a helical flange carried by said tube, one end of said helical flange being generally at the lowermost end of said flanges.

6. Apparatus as claimed in claim 5, said housing including means for rotating said tube with respect to said housing.

7. Apparatus as claimed in claim 1, and further including a plurality of collars selectively fixable to said housing, each collar of said plurality of collars being adapted to receive a blast aerator, one collar of said plurality of collars having an inside diameter generally equal to said second diameter, and another collar of said plurality of collars having an inside diameter generally equal to said third diameter.

* * * * *